United States Patent [19]

Hemme

[11] 3,743,971

[45] July 3, 1973

[54] VOR AM MODULATOR

[75] Inventor: William R. Hemme, Fairmont, Minn.

[73] Assignee: Collins Radio Company, Cedar Rapids, Iowa

[22] Filed: Sept. 3, 1971

[21] Appl. No.: 177,717

[52] U.S. Cl. .................... 332/38, 325/134, 328/173, 332/17, 343/106 R

[51] Int. Cl. ................................................ H03c 1/06

[58] Field of Search ........................... 332/38, 19, 17; 328/172, 173; 343/106 R, 106 D; 325/133, 134, 187

[56] References Cited

UNITED STATES PATENTS

| | | | |
|---|---|---|---|
| 2,877,424 | 3/1959 | Ross | 332/38 |
| 3,175,155 | 3/1965 | Holder | 332/17 X |
| 3,448,453 | 6/1969 | Earp et al. | 343/106 D |
| 3,495,247 | 2/1970 | Perkins | 343/106 R |
| 3,665,470 | 5/1972 | Hemme | 343/106 R |

*Primary Examiner*—Alfred L. Brody
*Attorney*—Richard W. Anderson et al.

[57] ABSTRACT

Amplitude modulation techniques are applied to a 9960 Hz subcarrier signal of the type defined by VOR navigation systems by means separately applying a 30 Hz variable phase test signal and a 9960 Hz subcarrier reference phase signal to an amplitude modulation means with the modulation means acting on the 9960 Hz frequency modulated subcarrier alone and selectively introducing controlled amplitude modulation levels of predetermined amplitude modulation components as exist in VOR transmission, with subsequent recombination with the 30 Hz variable phase signal to provide a selectively controlled composite modulation signal comprising a 30 Hz variable phase signal and a 9960 Hz frequency modulated reference subcarrier, the latter signal being amplitude modulated at selected modulation levels with predetermined amplitude modulation frequency components.

4 Claims, 3 Drawing Figures

VOR AM MODULATOR

This invention relates generally to signal generating devices and more particularly to an improved amplitude modulator by means of which selectively controlled levels of amplitude modulation may be imposed on a frequency modulated subcarrier.

In the specific embodiment to be exemplified herein the present invention resides in the provision of VOR AM modulator by means of which precisely controlled amplitude modulation levels of predetermined modulation components may be imposed on a 9960 Hz subcarrier frequency which in turn is frequency modulated at a predetermined deviation rate as defined by variable omnirange (VOR) navigation signals.

Accordingly, the object of the present invention is the provision of an amplitude modulation means by means of which a frequency modulated carrier may be amplitude modulated at precisely controlled modulation levels with selected amplitude modulation signal components.

The present invention is featured in the provision of an amplitude modulation means simulating the modulation from actual VOR ground stations such that the resulting modulation signal may permit tests representing as closely as possible the signal environment in which a VOR receiver is required to function.

The present invention is featured in the application of amplitude modulation techniques to a 9960 Hz subcarrier signal of the type defined by VOR navigation systems by means separately applying a 30 Hz variable phase test signal and 9960 Hz subcarrier reference phase signal to an amplitude modulation means with the modulation means acting on the 9960 Hz frequency modulated subcarrier alone and selectively introducing controlled amplitude modulation levels of predetermined amplitude modulation components as exist in VOR transmission, with subsequent recombination with the 30 Hz variable phase signal to provide a selectively controlled composite modulation signal comprising a 30 Hz variable phase signal and a 9960 Hz frequency modulated reference subcarrier, the latter signal being amplitude modulated at selected modulation levels with predetermined amplitude modulation frequency components.

These and other features and objects of the present invention will become apparent upon reading the following description with reference to the accompanying drawing in which.

Figure 1:
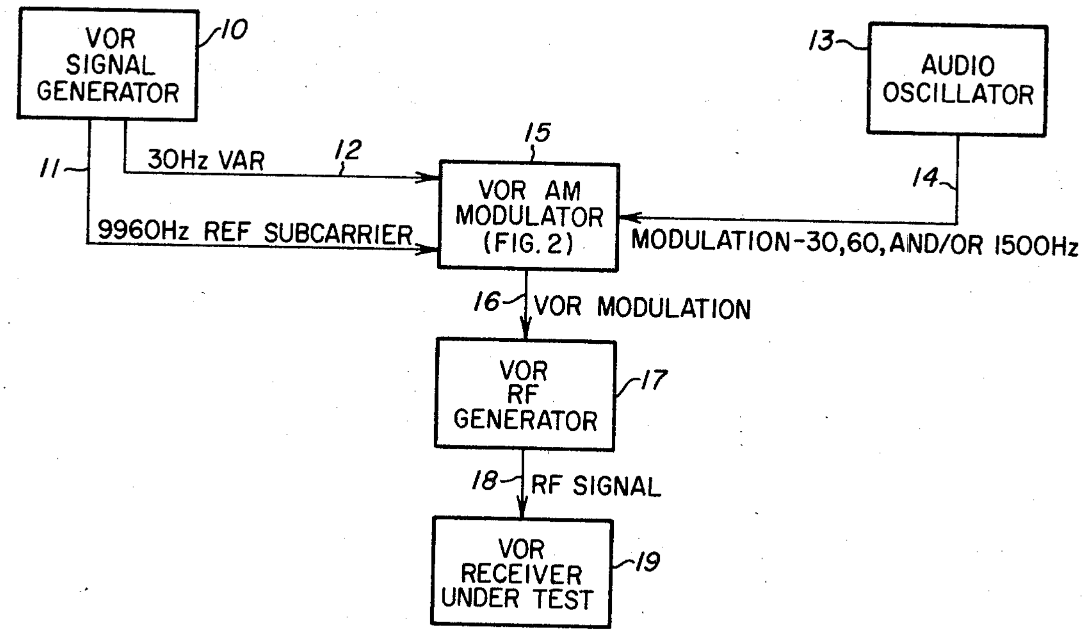
FIG. 1 is a generalized block diagram of a VOR test arrangement employing a VOR AM modulator in accordance with the present invention.

VOR systems presently in use develop a VOR bearing indication proportional to the phase between reference and variable phase 30 Hz signals. In the commonly employed VOR system, a cardiod antenna pattern that rotates 30 times per second produces a 30 Hz amplitude modulated signal in the aircraft receiver. The phase of this signal is a function of the receiver bearing from the transmitter. A 30 Hz reference signal is additionally transmitted as 30 Hz frequency modulation of a 9960 Hz AM subcarrier with a deviation of ±480 Hz. The airborne receiver develops an output indication of VOR bearing by comparing the phase between these two 30 Hz modulations. In a further employed system known as Doppler VOR, the 30 Hz AM modulation does not vary with direction, but the phase of the 30 Hz FM modulation of the 9960 Hz subcarrier becomes a function of the direction from the VOR stations. These two systems are compatible since the same receiver may be employed with both systems.

Various types of Doppler VOR ground stations have been commissioned to solve the VOR radial "scalloping" problem caused by multi-path reception of signals from a standard type VOR ground station located in rough terrain. The relatively new Doppler VOR ground transmitting stations, however, emanate the variable phase 9960 Hz subcarrier with amplitude modulation components of 30 Hz, 60 Hz, and/or 1500 Hz. Thus, if the VOR receiver's subcarrier discriminator, which detects the 30 Hz FM modulation signal from the 9960 Hz subcarrier, additionally responds to the amplitude modulation components, serious bearing errors may result.

A Radio Technical Commission for Aeronautics (RTCA) committee is currently preparing a new TSO for VOR navigation equipment. Included in this TSO is expected to be a new requirement (among others) referred to as the Doppler VOR Signal Test. The purpose of this Doppler VOR Signal Test is to check a VOR receiver's susceptibility to a normal 9960 Hz subcarrier with 30 Hz frequency modulation that has been additionally amplitude modulated up to 40 percent with signals of 30 Hz, 60 Hz, and 1500 Hz. All the various and different types of Doppler VOR ground transmitting stations contain one or more of the above three frequencies amplitude modulated onto the 9960 Hz subcarrier.

The VOR AM modulator to be described herein simulates the modulation from actual VOR ground stations to permit a test representing as closely as possible the signal environment in which a VOR receiver is required to function. The AM modulator to be described may thereby be employed to provide adequate design information so that a VOR receiver can be designed to avoid susceptibility to the above described AM modulation components on the 9960 Hz subcarrier. The modulator to be described will also permit testing a VOR receiver to the pending TSO requirements.

With reference to FIG. 1 the VOR AM modulator of the present invention may be inserted between a VOR signal generator 10 (such as the Collins Type 479s-3) and a VOR RF generator 17 (such as a Boonton Type 211A). An audio oscillator 13 may be employed as the source of AM modulation for the 9960 Hz subcarrier by providing an input in the form of a 30, 60, and/or 1500 Hz modulation signal 14 to the VOR AM modulator 15.

The VOR signal generator 10 provides an input 11 to the AM modulator 15 in the form of a 9960 Hz subcarrier and an input 12 in the form of a 30 Hz signal.

FIG. 1 represents the 9960 Hz subcarrier 11 as being a "reference" subcarrier while the 30 Hz signal 12 is designed as a "variable phase" signal. It is to be understood that these references are for the purpose of description only and relate to a standard VOR station where the 9960 Hz signal modulation component carries a reference 30 Hz frequency modulation component for comparison with a 30 Hz variable phase signal. Since, however, existing VOR receivers are entirely compatible with both the standard VOR transmission and the Doppler VOR transmission, the test setup of FIG. 1 refers to the modulation components of reference and variable phase signals in the standard sense, it being realized that the receiver ultimately provides a bearing indication depending upon the phase discrepancy between two 30 Hz signals, and it is immaterial whether the frequency modulated 30 Hz signal varies with aircraft location with respect to the ground transmission or the 30 Hz amplitude modulation component varies with the receiver location. It should be emphasized, however, that within the standard VOR receiver, which is compatible with either the standard VOR transmission or the Doppler VOR transmission, there exists a 9960 Hz discriminator the function of which is to separably recover the 30 cycle frequency modulation component for comparison with the 30 cycle amplitude modulation signal.

The output 16 from the VOR AM modulator 15 of the present invention thus comprises a VOR modulation signal comprised of a 30 Hz variable phase component and a 9960 Hz subcarrier component which is frequency modulated at a 30 Hz rate and which is, in turn, amplitude modulated by one or more of the 30, 60, and 1500 Hz components supplied to the AM modulator 15 as input 14 from audio oscillator 13.

The composite VOR modulation signal 16 is applied to a VOR RF generator 17 with the latter providing a VOR carrier frequency in any one of 100 KHz steps within the VOR defined frequency range of 108–118 MHz. The output 18 from RF generator 17 thus simulates a received VOR signal from the ground station for application to a VOR receiver 19 which may be under test. The VOR AM modulator of the present invention as will be further described, provides a means for selectively and precisely introducing a controlled level of amplitude modulation of the 9960 Hz subcarrier by one or more of the modulation components of 30 Hz, 60 Hz, and 1500 Hz.

Figure 2:
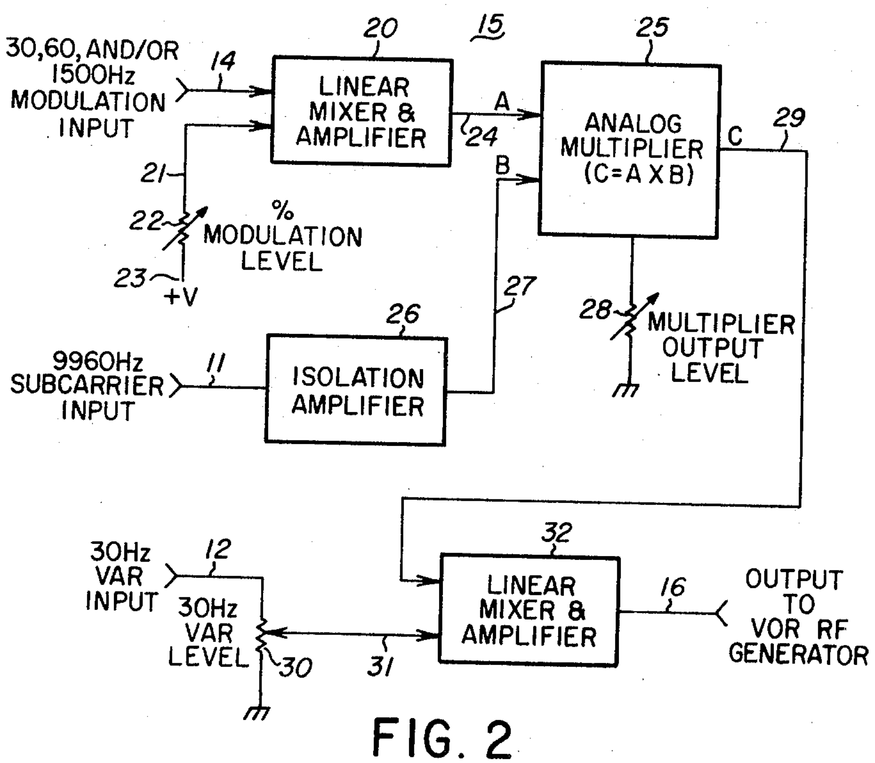
FIG. 2 is a functional block diagram of a VOR AM modulator embodiment in accordance with the present invention.

A functional block diagram of the VOR AM modulator of the present invention is illustrated in FIG. 2. As indicated in FIG. 2, the 30 Hz and 9960 Hz signals (as might be supplied from VOR signal generator 10 of FIG. 1) are applied separately to the AM modulator so that the 9960 Hz subcarrier alone can be amplitude modulated. In general, the resulting amplitude modulated 9960 subcarrier and the 30 Hz signal from VOR signal generator 10 are recombined in the modulator and applied as a composite VOR modulation signal at the output of the AM modulator. With reference to FIG. 2, the 30, 60, and/or 1500 Hz modulation input signal 14 from audio oscillator 13 of FIG. 1 is applied at first input to a linear mixer and amplifier 20. A percent modulation level control in the form of a selectively variable DC signal 21 is additionally applied to linear mixer and amplifier 20. The modulation level selection is depicted functionally as a selectively variable resistance 22 connected to a positive DC voltage source 23.

The output 24 from linear mixer and amplifier 20 is applied as a first input A to an analog multiplier 25. The 9960 Hz subcarrier signal 11 from VOR signal generator 10 of FIG. 1 is applied through an isolation amplifier 26 the output 27 of which is applied is a second input B to analog multiplier 25. Associated with analog multiplier 25 is a variable resistance control 28 functioning as a multiplier output level control.

The output 29 from the analog multiplier is applied as a first input to a further linear mixer and amplifier 32. A second input 31 to the linear mixer and amplifier 32 comprises a selectively variable level (by means of control 30) of the 30 Hz input signal 12 as might be applied from the VOR signal generator 10 of FIG. 1. The output 16 from linear mixer and amplifier 32, as will be further described, comprises the composite VOR modulation signal containing a selectively variable level of the 30 Hz variable phase signal along with the 9960 Hz subcarrier signal which is amplitude modulated at selected levels of one or more of the 30, 60, and 1500 Hz amplitude modulation components 14 from the audio oscillator 13 of FIG. 1.

Operation of the VOR AM modulator of the present invention is defined as follows. The 30 Hz, 60 Hz, or 1500 Hz modulation component input 14 may be represented as:

$$V_m = E_1 \sin \omega_m t \quad (1)$$

The dc bias 21 for linear mixer/amplifier 20 from the percent modulation level control 22 may be represented by $K_1V_{dc}$, where $K_1$ is a constant set by the position of control 22. The output of the linear mixer/amplifier 20 may then be represented by:

$$A = K_2(E_1 \sin \omega_m t + K_1 V_{dc}) \quad (2)$$

where $K_2$ is the amplifier gain. The 9960 Hz subcarrier signal 11 may be represented by:

$$V_c = E_2 \sin(\omega_c t + \beta \sin \omega_r t) \quad (3)$$

where $\omega_c$ is the 9960 Hz subcarrier and $\omega_r$ is the 30 Hz frequency modulation component imposed on the 9960 Hz subcarrier. The output 27 of the isolation amplifier stage 26 may then be represented by:

$$B = K_3 E_2 \sin(\omega_c t + \beta \sin \omega_r t) \quad (4)$$

where $K_3$ is the gain of amplifier 26. The output of the analog multiplier stage 25 which receives the outputs from mixer/amplifier 20 and isolation amplifier 26 as respective inputs thereto may then be expressed as:

$$C = A \times B = K_2K_3K_4[E_1 \sin \omega_m t + K_1 V_{dc}]\,[\sin(\omega_c t + \beta \sin \omega_r t)] \quad (5)$$

where $K_4$ is the gain of multiplier 25 which may be adjusted by the multiplier output level control 28.

Examination of expression 5 above reveals that the output from analog amplifier 25 is in the form of amplitude modulation of the 9960 Hz subcarrier by $\omega_m$. The amplitude modulation level will be, for example, 40 percent if $E_1$ equals 40 percent of $K_1V_{dc}$. The output 29 from analog multiplier 25 (expression 5) is then linearly mixed with a selected level of the 30 Hz variable phase input signal 12 in linear mixer/amplifier stage 32. The output 16 from linear mixer/amplifier 32 contains the VOR modulation necessary to conduct the above described Doppler VOR test, that is, contains a 30 Hz variable phase signal and 9960 Hz subcarrier signal frequency modulated at a deviation rate of 30 Hz and further amplitude modulated at selected levels of the amplitude modulation components 30, 60, and/or 1500 Hz.

Figure 3:
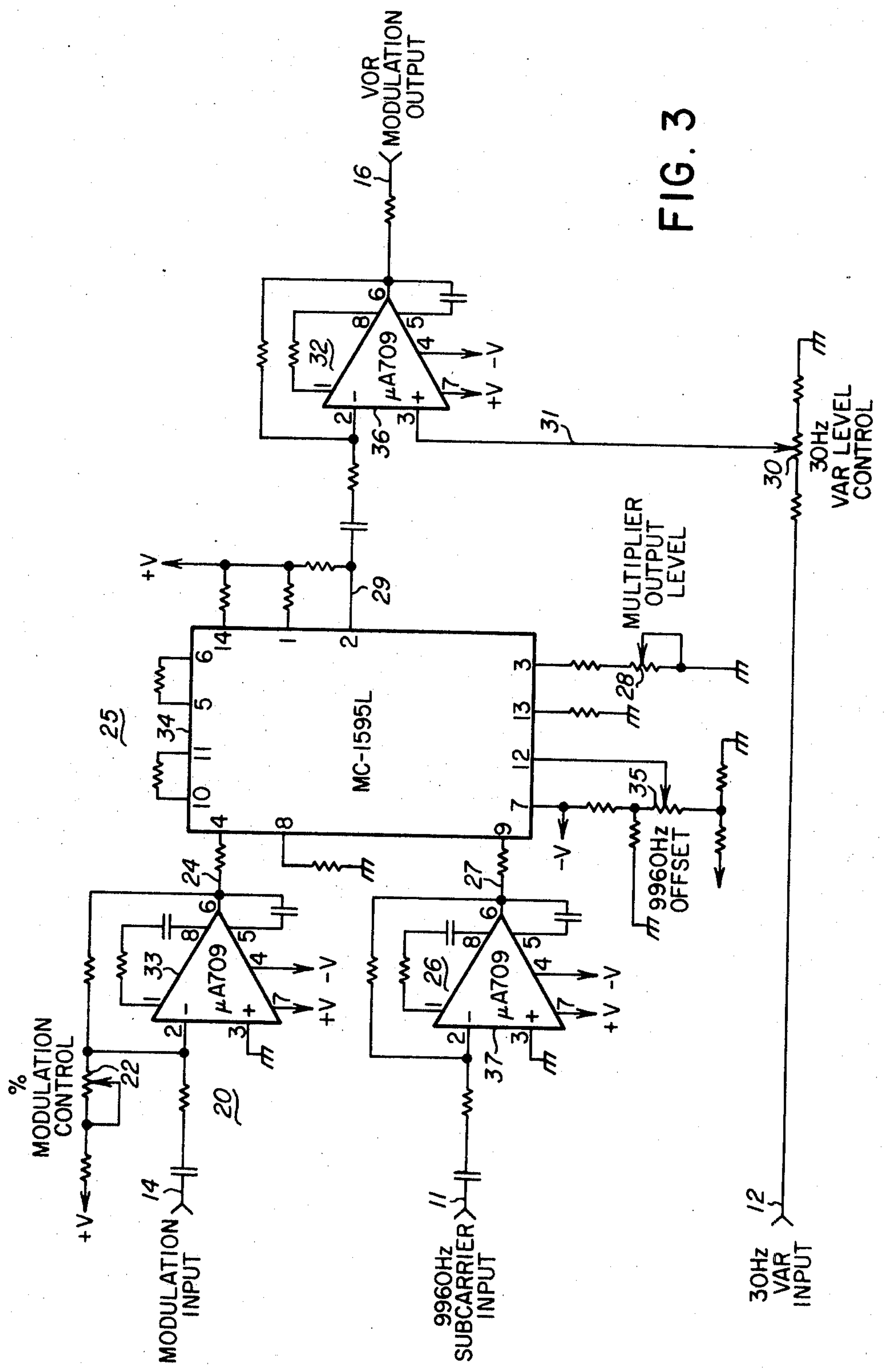
FIG. 3 is a functional schematic of a particular embodiment of a VOR AM modulator in accordance with the present invention.

A functional schematic diagram of an embodiment of the VOR AM modulator of the present invention is illustrated in FIG. 3. Linear mixer/amplifier 20, to which the 30, 60, and 1500 Hz modulation input signals 14 are applied is seen to be implemented with a commercially available type $\mu$A709 functional element 33 including the DC bias percent modulation control variable resistance 22 by means of which the modulation level of the 30, 60, and 1500 Hz components may be selectively adjusted.

The 9960 Hz subcarrier input 11 is seen to be applied to isolation amplifier 26, the latter being implemented with a commerically available type $\mu$A709 functional element 37.

The outputs 24 and 27 from linear mixer/amplifier 20 and isolation amplifier 26, respectively, are applied as respective first and second inputs to the analog multiplier 25, the latter being implemented with a commercially available type MC–1595L functional element 34. Analog multiplier 25 includes the multiplier output level adjustment control 28 as a variable resistance member and a further variable resistance member 35 labeled "9960 Hz Offset." The 9960 Hz Offset control 35 illustrated in the schematic diagram may be employed to null out unwanted modulation products from the analog multiplier 25 caused by voltage offsets in the input 27 to the multiplier from isolation amplifier 26.

Linear mixer/amplifier 32, which receives the output 29 from analog multiplier 25 and the level controlled 30 Hz variable phase signal 31 from level control 30 is implemented with a further commercially available type $\mu$A709 functional element 36. The output 16 from mixer/amplifier 32 comprises the VOR modulation output signal in accordance with the present invention as a composite modulation signal including a variable level 30 Hz signal and a 9960 subcarrier signal frequency modulated at a 30 Hz deviation rate and further amplitude modulated at a selected modulation level in accordance with a 30, 60, and/or 1500 Hz signal.

The present invention is thus seen to provide an amplitude modulator which may be used in conjunction with a VOR signal generator, an audio oscillator, and a VOR RF generator to simulate the modulation carried by an actual VOR ground station with the 9960 Hz subcarrier signal, in addition to the normal 30 Hz deviation rate frequency modulation thereof, being amplitude modulated at selected modulation levels by modulation components of the type typically emanated by Doppler VOR ground stations to permit a complete and exacting test of a VOR receiver as concerns susceptibility to amplitude modulation components on the 9960 Hz subcarrier signal of received VOR signal.

Althogh the present invention has been described with respect to a particular embodiment thereof, it is not to be so limited, as changes might be made therein which fall within the scope of the invention as defined by the appended claims.

I claim:

1. Means for amplitude modulating a carrier signal at a selected modulation level by a modulating signal source, comprising isolation amplifier means to which said carrier signal is applied as input, first linear signal mixing means to which said modulating signal is applied as a first input, a variable direct current voltage signal source applied as a second input to said first linear signal mixing means, signal multiplying means, the outputs from said first linear signal mixing means and said isolation amplifier means being applied as respective inputs to said signal multiplying means, the output from said signal multiplying means comprising said carrier signal amplitude modulated by said modulation input signal and with a percentage modulation level proportional to the magnitude of said variable DC voltage source.

2. Modulation means as defined in claim 1 wherein said signal multiplying means comprises means for selectively adjusting the output level thereof and including means to null out undesired modulation products from said analog multiplier output as effected by voltage offsets in the carrier signal input to said multiplier as applied from said isolation amplifier means.

3. Modulation means as defined in claim 2 including a further linear signal mixing means to which the output from said multiplier means is applied as a first input, and means for applying a selectively variable level further input signal as second input to said further linear signal mixing means, the output from said further linear mixing means comprising said subcarrier input signal amplitude modulated at a selected modulation level at at least one of a plurality of tonal modulation input signals as applied to said first linear signal mixing means together with a selected level of said first input signal.

4. Modulation means as defined in claim 3 wherein said carrier signal input comprises a 9960 Hz subcarrier frequency modulated at a deviation rate of 30 Hz, said modulating signal input comprising at least one of tonal modulation signals of 30 Hz, 60 Hz, and 1500 Hz, and said further input signal comprising a 30 Hz input signal, whereby the output from said further linear mixing means comprises a composite VOR modulation signal with the subcarrier component thereof further amplitude modulated at a selected modulation level by said modulating signal input.

* * * * *